June 1, 1926.
J. S. WALLER
1,586,866
COMBINED BUMPER AND SHOCK ABSORBER
Filed Jan. 13, 1926
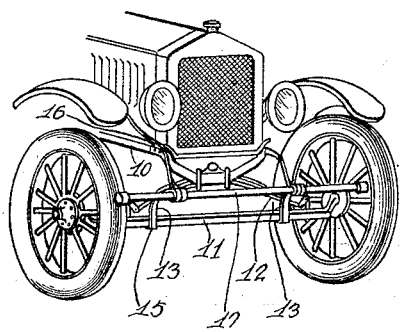
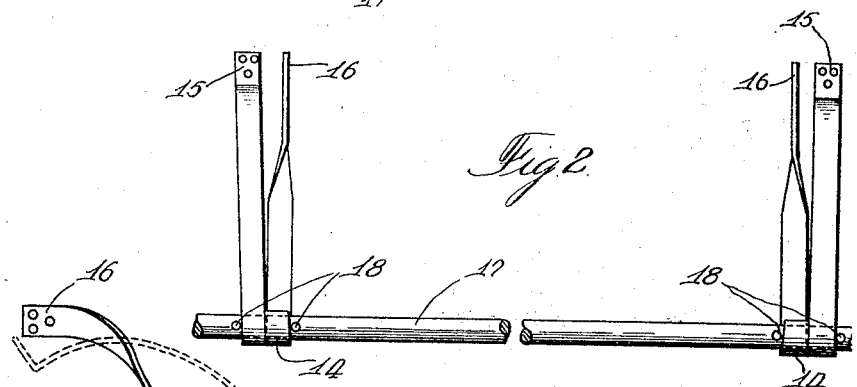
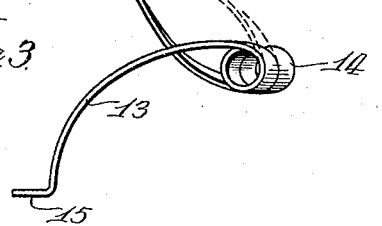
Inventor:
Jesse S. Waller
By Nissen & Crane Attys Patented June 1, 1926.

1,586,866

UNITED STATES PATENT OFFICE.

JESSE S. WALLER, OF TERRE HAUTE, INDIANA.

COMBINED BUMPER AND SHOCK ABSORBER.

Application filed January 13, 1926. Serial No. 80,864.

This invention relates to an attachment for automobiles which serves the double function of bumper and shock absorber.

The object of the invention is to provide a device of the class named which may be readily applied to an automobile and which will serve the double purpose of bumper and shock absorber and which shall be of improved construction and operation.

The invention is exemplified in the combination and arrangement of parts shown in the accompanying drawing and described in the following specification, and it is more particularly pointed out in the appended claims.

In the drawing—

Fig. 1 is a perspective view of a portion of an automobile having one embodiment of the present invention applied thereto;

Fig. 2 is a top plan of the combined bumper and shock absorber embodied in the present invention; and Fig. 3 is a perspective view of one of the springs forming a part of the invention.

In the drawing, the numeral 10 designates the frame of an automobile supported on an axle 11 and having springs 12 of any improved construction interposed between the frame and axle. A pair of springs 13 are formed, as shown in Fig. 3, with an intermediate coil 14. The springs may be of flat spring steel or may be made of steel rods. One end 15 of each spring is attached to the axle 11 while the other end 16 is secured to the frame 10. The spring is preferably made so that when the parts are secured in place the spring material will be placed under initial tension tending to move the ends of the spring toward each other. If the spring is formed to take a normal position indicated in the broken lines in Fig. 3, it may be spread apart when it is applied to the automobile so that the tendency of the spring is to close the ends together.

A bumper rod 17 is inserted through the coils 14 and extends in front of the automobile to serve as a bumper. Any suitable means may be employed for preventing longitudinal movement of the rod, pins 18 being shown in the drawing for this purpose. It will be noted that the arms of the spring cross each other between the coils 14 and the points of attachment 15 and 16. This is an important feature of the invention as it facilitates yielding of the spring under impact against the bumper 17.

The initial tension in the spring member may be regulated to any desired amount by regulating the normal position which the arms of the spring take when free and by properly designing the spring to give the desired resiliency. It will be seen that the tension placed in the spring will counteract any tendency to rebound without adding stiffness to the spring support of the car. The crossed relation of the arms not only facilitates yielding under impact, but also adds greatly to the appearance of the bumper as it provides a forwardly projecting support having the necessary forward reach and at the same time gives the appearance of stability by providing upper and lower bracing members. These members, of course, not only give appearance of stability, but actually provide a sturdy support for the bumper rod and one which will yield under impact to prevent injury to the parts of the car.

The invention is simple and economical to manufacture, pleasing in appearance, and efficient in operation both as a bumper and shock absorber.

It will be seen from the drawing that the helical spring coil 14 permits one arm of the spring to offset relative to the other arm so that the point of connection 15 may be offset relative to the part 16 attached to the frame. This permits of considerable leeway in applying the device to cars of different makes as the coil 14 may be made longer or shorter to bring the part 15 into registration with the part of the axle 11 to which it may be most conveniently attached.

I claim:—

1. A combined bumper and shock absorber comprising a pair of spring members having spaced arms for attachment to spaced portions of a car, said spring members having means thereon for supporting a bumper bar, the arms of said members being sprung apart beyond their normal relative position when attached to the car to give an initial tension to said spring members tending to close them together.

2. The combination with a vehicle having a frame, an axle, and a spring interposed between said frame and axle, of a combined bumper and shock absorber for said vehicle, said bumper and shock absorber comprising a pair of spring members each having arms secured to said vehicle frame and axle, respectively, and having intermediate loops for supporting a bumper bar.

3. The combination with a vehicle having a frame, an axle, and a spring interposed between said frame and axle, of a combined bumper and shock absorber for said vehicle, said bumper and shock absorber comprising a pair of spring members each having arms secured to said vehicle frame and axle, respectively, and having intermediate loops for supporting a bumper bar, said spring members having an initial tension when secured to said vehicle tending to close said arms together.

4. A combined bumper support and shock absorber for an automobile comprising a spring bar bent to form a loop between the ends thereof for receiving a bumper rod, the arms of said bar at opposite sides of said loop being arranged to cross each other and having means at the ends thereof for attachment to spaced portions of a vehicle.

5. The combination with a vehicle having a supporting portion, a body member supported thereon, and a spring interposed between said supporting portion and body member, of a combined bumper support and shock absorber for said vehicle comprising a spring bar bent to form a loop between the ends thereof, the portions of said bar at opposite sides of said loop being arranged to cross each other and having the ends thereof secured to said body member and supporting portion, respectively, said bar having an initial tension therein tending to close the ends of said crossed portions toward each other.

6. The combination with a vehicle having an axle, a frame, and a spring interposed between said axle and frame, of a pair of combined bumper supports and shock absorbers each of which comprises a bar bent to form a loop between the ends thereof, the portions of said bar at opposite sides of said loop being curved and arranged to cross each other, the ends of said crossed portions being secured to said axle and frame, respectively, and a bumper rod extending through and supported by said loops.

7. The combination with a vehicle having an axle, a frame, and a spring interposed between said axle and frame, of a pair of combined bumper supports and shock absorbers each of which comprises a bar bent to form a loop between the ends thereof, the portions of said bar at opposite sides of said loop being curved and arranged to cross each other, the ends of said crossed portions being secured to said axle and frame, respectively, and a bumper rod extending through and supported by said loops, said bars being given an initial tension tending to close the ends thereof toward each other.

8. A combined shock absorber and bumper support comprising a bar of flat spring steel bent between its ends to form a helical loop, the portions of said bar at opposite sides of said loop being curved and arranged to cross each other, and means for attaching the ends of said bar to spaced portions of a vehicle.

9. The combination with a vehicle having spaced spring connected portions, of a combined bumper support and shock absorber interposed between said portions, said bumper support and shock absorber comprising a flat spring bar bent between its ends to form a helical loop for receiving a bumper rod, the portions of said bar at opposite sides of said loop being arranged to cross each other and having the ends thereof attached to the spaced portions of said vehicle, one end portion of said bar being twisted to bring the plane thereof at an angle to the plane of the other end portion.

10. In combination, a vehicle axle, a vehicle frame, a spring for supporting said frame on said axle, and a combined bumper and shock absorber interposed between said axle and frame and projecting forwardly from said vehicle, said combined bumper and shock absorber comprising a pair of spring bars bent between their ends to form helical loops, the portions of said bars at opposite sides of said loops being curved and arranged to cross each other and having their ends secured to said axle and frame, respectively, said bars being arranged in spaced relation along said axle and at opposite sides of said frame, and a bumper rod extending through the helical loops formed by said bars.

In testimony whereof I have signed my name to this specification on this 7th day of January, A. D. 1926.

JESSE S. WALLER.